United States Patent [19]

Hickey

[11] 4,140,191
[45] Feb. 20, 1979

[54] STORAGE OF WHEELED VEHICLES

[75] Inventor: Christopher D. D. Hickey, Esher, England

[73] Assignee: Airflex Containers Limited, Kent, England

[21] Appl. No.: 843,208

[22] Filed: Oct. 18, 1977

[30] Foreign Application Priority Data

Nov. 1, 1976 [GB] United Kingdom ............... 45384/76

[51] Int. Cl.² .............................................. E04H 6/06
[52] U.S. Cl. ....................................... 180/1 R; 74/14; 150/52 K
[58] Field of Search ....... 73/117; 52/27, 29, DIG. 14; 214/16.1 R; 74/14; 206/335; 180/1 R

[56] References Cited

U.S. PATENT DOCUMENTS 2,786,168   3/1957   Finney et al. ...................... 74/14 X

FOREIGN PATENT DOCUMENTS 225511   2/1969   U.S.S.R. ..................... 73/117

Primary Examiner—Jerry W. Myracle
Attorney, Agent, or Firm—Young & Thompson

[57] ABSTRACT

A sealed container for storing a wheeled vehicle has roller supports for the wheels of the vehicle and drive means, e.g. an electric drive, for at least one of the roller supports, the drive means being controlled from outside the container whereby the supported wheel or wheels of the vehicle may be rotated without unsealing the container and removing the vehicle. If the vehicle is left in gear, the engine and vehicle transmission system, together with all the wheels, can be exercised using only one rotatably driven wheel support. Provision is made also for exercising the vehicle suspension by raising and lowering the wheels.

17 Claims, 3 Drawing Figures

STORAGE OF WHEELED VEHICLES

BACKGROUND OF THE INVENTION

1. Field of the Invention

This invention relates to the storage of wheeled vehicles.

2. Prior Art

It is often required to store vehicles, particularly military vehicles, for long periods of time yet to keep them in a condition such that they are immediately ready for use when required. For this purpose it is convenient to use a flexible container, such as for example the container described in U.S. Pat. No. 3,929,178, comprising an impermeable base member and a flexible impermeable cover sealed to the base member. The base member may have a continuous channel with sealing means for sealing the periphery of the cover into said channel to provide a fluidtight seal therewith. Valve means may be provided for controlling an outlet of air from the interior of the container whereby suction can be applied to and maintained within the interior of the container. With such an arrangement, a vehicle, ready for immediate use and containing fuel, may be stored for relatively long periods of time. When it is required for use, the cover is removed and the vehicle can be driven off the base.

If a vehicle is left for a long time however without the engine and transmission system being turned over, bearings may become corroded and oil seals may take a "set". The practice heretofore therefore has been to remove such vehicles from their storage containers periodically and to start the engine and drive the vehicle to move it before returning it to its container. This requires a considerable amount of labour, particularly when using the above-described type of flexible container where the cover portion is commonly made of thick plastic material, e.g. thick butyl rubber sheet which is quite heavy to handle. The cover portion has to be removed from over the top of the vehicle and the vehicle then started and driven off the base. Subsequently, after the vehicle has been cleaned and dried and put back on its base, the cover has to be put over the vehicle and re-sealed and the suction then applied to remove air from the container.

SUMMARY OF THE INVENTION

It is one object of the present invention to provide an improved form of method and apparatus for the storing of vehicles.

According to one aspect of the present invention a method of storing a wheeled vehicle includes the steps of putting the vehicle into an airtight container with at least one of the wheels of the vehicle resting on drive means capable of being electrically driven to rotate that wheel when the drive means are energised and periodically energising said drive means. The vehicle may be left "in gear", that is with the engine coupled by transmission means to the road wheels, so that rotation of any one road wheel will rotate not only that wheel but also the engine of the vehicle and the drive between the engine and the driven wheel. Usually it will be sufficient to drive one wheel only, the other wheels of the vehicle being supported on a freely-movable track or freely-rotatable rollers, balls or the like.

Using this method, it is no longer necessary to remove the vehicle from the container in order to turn over the engine and transmission system. This can be effected by energising the electrical drive system while the vehicle is still within the container. Typically this would be done every few months.

As indicated above, this method has particular application to the storage of a vehicle in a container comprising an impermeable base member and a flexible cover sealed to the base with an outlet for air from the container whereby suction can be applied to and maintained within the interior of the container. In such an arrangement, it may be desirable in many cases to lift the cover away from close contact with the vehicle before turning over the wheels and engine. For this purpose, the container may be inflated before energising the drive means and, after the vehicle has been so exercised, the drive can be switched off and suction again applied to the interior of the cover to restore the container to a partially evacuated condition in which the cover is held tightly down on the vehicle.

For piston-engined vehicles, in order to enable the engine to turn over freely, it may be desirable to remove the sparking plugs from the cylinders of the engine. This would necessitate putting the sparking plugs back before the vehicle can be driven away but that is a relatively simple operation giving negligible delay in bringing the stored vehicles into service. It will be seen that, by using the technique described above very considerable labour is saved in the maintenance of the vehicles during storage.

The invention furthermore includes within its scope an airtight sealed container for the storage of a wheeled vehicle and having support means drivingly engaging at least one wheel of the vehicle whereby at least that wheel can be rotated without removing the vehicle from the container. Means may also be provided for raising and lowering each of the wheels of the vehicle to exercise the suspension of the vehicle.

According to another aspect of the invention, a container for the storage of a wheeled vehicle comprises a base and a flexible impermeable cover with sealing means adapted to seal the periphery of the cover to said base and valve means controlling an outlet of air from the interior of the container whereby suction can be applied to and maintained within said interior and electrically energisable drive means, controllable from outside the container, arranged to drive a wheel support on said base for supporting and driving at least one wheel of the vehicle. Preferably the base includes wheel supports for all of the wheels of the vehicle. These wheel supports may each include movable or rotatable means which are conveniently a pair of rollers having spaced parallel axes.

The wheel support arrangement will depend on the construction of the particular vehicle to be stored. Commonly military vehicles have a drive to all the wheels of the vehicle. In such a case one wheel support may be driven by the electric drive means and all the other wheels of the vehicle are supported on freely movable supports. The vehicle may be left in gear so that operation of the drive means will turn over the engine and rotate all the wheels. Alternatively, if it is not required to turn over the engine, the gear may be left in neutral; in this case drive may be applied to all the wheels.

Preferably means are provided for inflating the container as well as for applying suction thereto so that the container cover can be lifted away from the vehicle by air pressure within the container when it is desired to exercise the vehicle.

Separate air inlet and air outlet valves may be provided spaced apart in the container, e.g. one at each end of the container, so that dry air may be fed into the container at one end as air is sucked out at the other end. Such an arrangement may be used for drying a vehicle which has to be put into the store under conditions of rain or snow.

Means may also be provided for cyclically raising and lowering wheels of the vehicle to exercise the suspension of the vehicle. In one arrangement means are provided for differentially raising and lowering the wheel supports to exercise the suspension of the vehicle; such means may be wholly located inside the container but electrically or otherwise energised from an external source whereby they may be operated without removing the vehicle from within the container. These means may be separate from the wheel rotation drive or they may be constituted by non-circular or eccentrically mounted rotatable wheel supports, e.g. by cam surfaces on the support rollers so that rotation of these support rollers will exercise the suspension.

DESCRIPTION OF THE PREFERRED EMBODIMENTS

Figure 1:
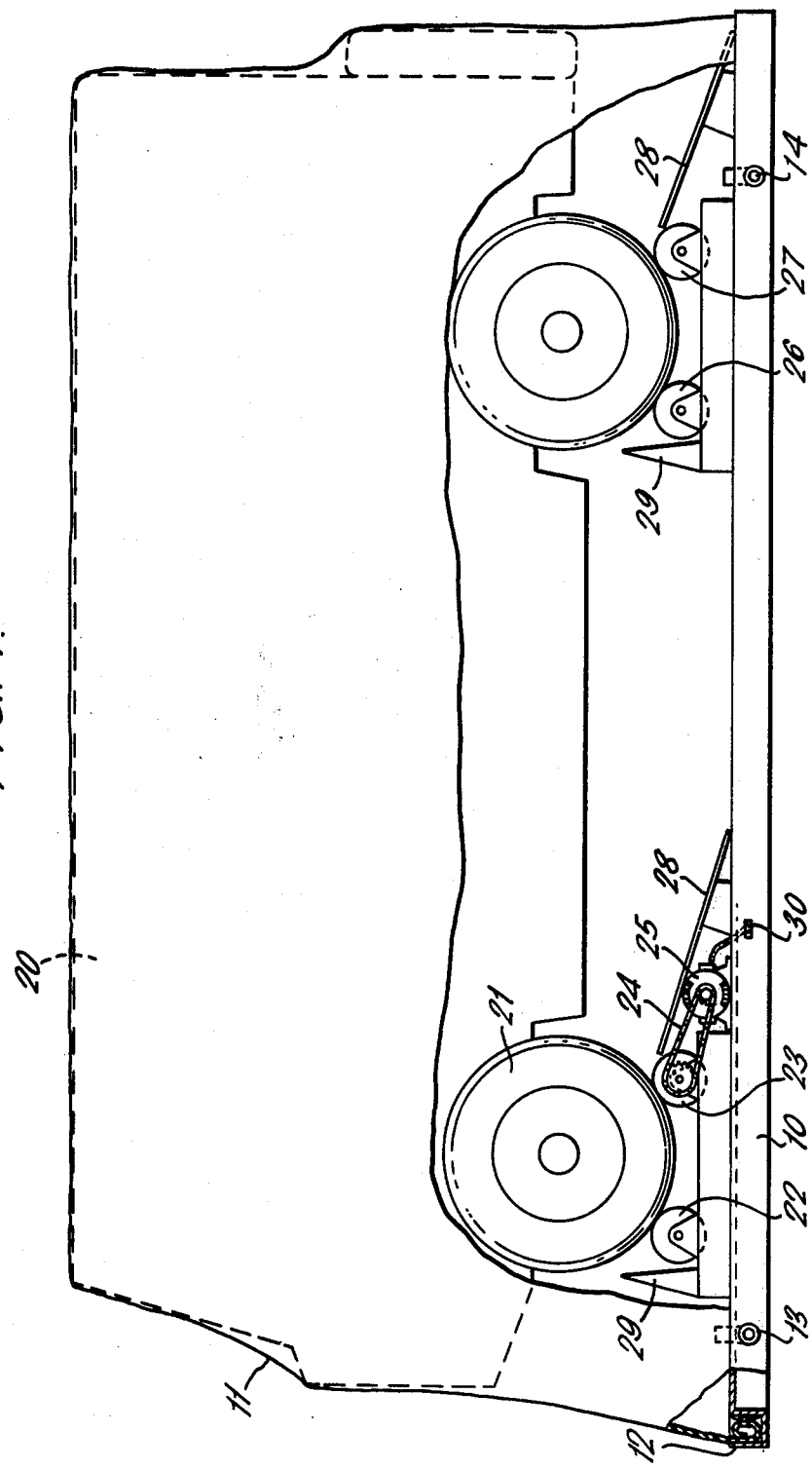
FIG. 1 is a diagrammatic side elevation of a container and vehicle with part of the container cover cut away to illustrate one embodiment of the invention.

Referring to FIG. 1 of the drawings there is shown a container comprising a base 10 of impermeable material and a flexible cover 11. The base 10 may be a rigid member or it may be a flexible member, although in the latter case, it is preferred to provide a rigid structure over which a vehicle may be driven to position it with the wheels on wheel supports to be described later. The cover 11 is of flexible impermeable material for example butyl rubber and is sealed to the base by any convenient means. Conveniently a continuous groove 12 is formed in the base structure to extend around the periphery thereof and the periphery of the cover is sealed in this groove by means of an inflatable tube, for example as described in the aforementioned Pat. No. 3,929,178. Valve means 13 are provided for controlling an outlet for air from the interior of the container. This may be a two-way valve system permitting air to be sucked out of the container to establish a partial vacuum therein and also allowing the container to be inflated to lift the cover off the vehicle. Provision may be made for enabling inflation to be effected with dry air or possibly with an inert gas such as nitrogen. If the cover 11 is initially inflated with dry air and then subsequently partially evacuated so that the cover is drawn tightly down onto the vehicle, negligible moisture is left in the small amount of air remaining within the container. Preferably however two separate valves are provided, spaced apart in the container. Valve 13 may be arranged for extraction of air from the container and a valve 14 is provided near the other end of the container for admitting dry air.

In the particular arrangement illustrated for storing a vehicle 20, one wheel 21 of the vehicle is supported on electrically-driven drive means comprising a pair of rollers 22, 23, the roller 23 being driven through a reduction drive 24 by an electric motor 25. The other wheels of the vehicle are supported on freely-rotatable rollers such as the rollers 26, 27. The motor 25 is electrically powered through a supply cable, not shown, which passes through the base of the container to the outside thereof and is sealed where it passes into the container. A switch 30 is provided outside the container, e.g. on the base 10 to enable the motor to be energised and controlled without requiring access to the interior of the container.

To facilitate putting the vehicle into position on the rollers 23,24,26,27, ramps 28 and stops 29 are provided on the wheel supports. Provision is also made for locking the support rollers to enable the vehicle to be driven onto them. Alternatively, means may be provided for lowering the wheel supports into the base so that the vehicle can be positioned with the wheels supported by the base.

To store a vehicle, the vehicle is driven onto the base with the wheels resting on the appropriate wheel supports. The vehicle is left in gear so that rotation of the wheel 21 ensures that the transmission system and engine is turned over. The sparking plugs are removed from the engine of the vehicle to allow the engine to turn over freely. Preferably also, if the vehicle is to be stored with fuel in the vehicle, means are provided, e.g. a valve for shutting off the fuel supply from the engine. The cover 11 is then put over the base 10 and sealed thereto and suction then applied to evacuate air at least partially from the region between the base and the cover thereby drawing the cover tightly down onto the vehicle. As previously explained, the container may be initially inflated with dry air or with an inert gas before being partially evacuated.

When it is required to exercise a vehicle, air is admitted into the container which is inflated to lift the cover 11 away from the vehicle. The electric motor 25 is then energised for the required period of time to turn over the wheels and transmission system of the engine of the vehicle. Subsequently suction is applied to the container to draw the cover down tightly on the vehicle.

If it is required to turn over the road wheels and transmission system but not the engine, the gear box of the vehicle may be left in neutral; in this case drive means, e.g. a drive system similar to 24, 25, would be provided for each of the wheel supports.

Provision may be made to cause the wheel supports differentially to rise and fall so as to exercise the suspension of the vehicle. Such means would also be energised and controlled from outside the container so that there is no need to have access to the interior of the container.

Figure 2:
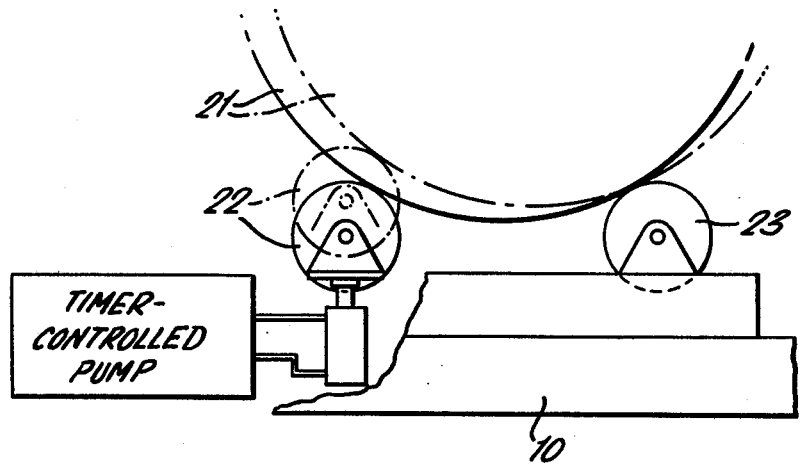
FIG. 2 shows a modification of the structure of FIG. 1, illustrating a means for exercising the suspension of a vehicle.

This raising and lowering of the wheel supports may readily be done in a number of different ways. For example, a slowly-rotated cam may be used or, as shown in FIG. 2, one of the rollers 22 of a support may be raised and lowered by means of a hydraulic jack 35 operated by an electrically-driven timer-controlled pump. Such a jack can readily be arranged to lift and lower the roller cyclically at a slow rate. When exercising a vehicle, the various jacks under separate wheel supports may be switched on, by switches on the base accessible from outside the container, in sequence so that the various wheels are raised and lowered separately or possibly together. The random timing will ensure differential movement of the various wheels.

Figure 3:
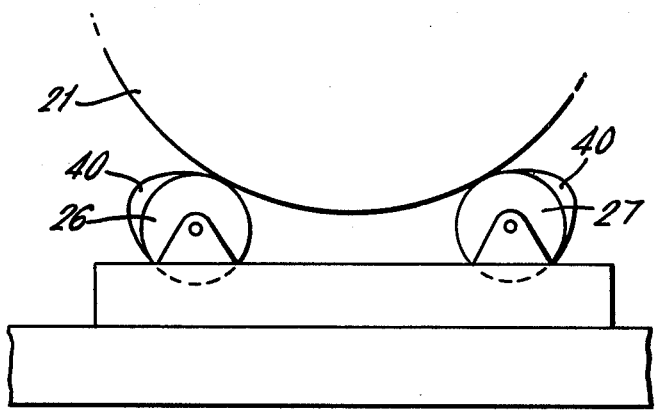
FIG. 3 illustrates diagrammatically an alternative means for exercising the suspension of a vehicle.

FIG. 3 illustrates another arrangement for exercising the suspension of the vehicle. In FIG. 3, the rollers, such as rollers 26, 27, have cam surfaces 40 which engage the wheel 21 of the vehicle as the roller rotates. Eccentrically mounted cylindrical rollers may be employed or rollers with one or more cam surfaces. Preferably both rollers in each support have such cam surfaces; the two rollers in this case may be coupled, e.g. by a chain drive or other means so that they rotate in synchronism whereby the wheel 21 is lifted by the two cams in a regular cyclic sequence. If desired all the support rollers may be driven in synchronism. Conveniently however the various rollers, except for one driven roller, may be made independently and freely rotatable so that the various wheels of the vehicle are lifted in a random sequence. As previously explained, provided one roller is driven, if the vehicle is left in gear, all the vehicle wheels will be driven and these will drive the other rollers to exercise the suspension.

I claim:

1. A method of storing a wheeled vehicle comprising the steps of putting the vehicle into an airtight container with at least one of the wheels of the vehicle resting on drive means capable of being electrically driven to rotate that wheel when the drive means are energised, periodically energising said drive means to rotate that wheel, and also periodically raising and lowering at least one wheel of the vehicle to exercise the suspension of the vehicle.

2. A method as claimed in claim 1 wherein the vehicle is stored "in gear" so that the engine is drivingly coupled to the road wheels, whereby the engine and the drive between the engine and said one of the wheels are rotated when said drive means are energized.

3. A method as claimed in claim 1 wherein only one wheel is driven by said drive means, the other wheels of the vehicle being supported on a freely-movable track or freely-rotatable rollers, balls or the like.

4. A method of storing a wheeled vehicle, comprising the steps of putting the vehicle into an airtight container with at least one of the wheels of the vehicle resting on drive means capable of being electrically driven to rotate that wheel when the drive means are energised, periodically energising said drive means, the airtight container comprising a container comprising an impermeable base member and a flexible cover sealed to the base with an outlet for air from the container whereby suction can be applied to and maintained within the interior of the container, inflating the container before energising the drive means to lift the cover off the vehicle and, after the vehicle has been so exercised, switching off the drive and applying suction to the interior of the cover to restore the container to a partially evacuated condition in which the cover is held tightly down on the vehicle.

5. An airtight sealed container for the storage of a wheeled vehicle and having support means drivingly engaging at least one wheel of the vehicle whereby at least that wheel can be rotated without removing the vehicle from the container, and means for raising and lowering each of the wheels of the vehicle to exercise the suspension of the vehicle.

6. A container as claimed in claim 5 wherein said means for raising and lowering each of the wheels of the vehicle to exercise the suspension of the vehicle comprise separate time-controlled lift means for each wheel.

7. An airtight sealed container adapted for the storage of a wheeled vehicle and having rollers for supporting the wheels of the vehicle, electrical drive means for driving at least one of said rollers and a control switch on the outside of said container arranged to control energization of said electrical drive means, and means for independently raising and lowering each of the wheels of the vehicle to exercise the suspension of the vehicle.

8. A container for the storage of a wheeled vehicle comprising a base, a flexible impermeable cover, sealing means adapted to seal the periphery of the cover to said base, an air outlet in said base for connection to a suction means and valve means controlling an outlet of air from the interior of the container whereby suction can be applied to and maintained within said interior and electrically energizable drive means, controllable from outside the container, arranged to drive a wheel support on said base for suporting and driving at least one wheel of the vehicle.

9. A container as claimed in claim 8 wherein wheel supports are provided for rotatably supporting all the wheels of the vehicle.

10. A container as claimed in claim 9 wherein the wheel supports are carried on said base and wherein ramps are provided for facilitating driving a vehicle onto the supports.

11. A container as claimed in claim 9 wherein each wheel support comprises a pair of rollers spaced on parallel axes spaced apart.

12. A container as claimed in claim 8 wherein means are provided for inflating the container as well as for applying suction thereto so that the cover can be lifted away from the vehicle by air pressure within the container when it is desired to exercise the vehicle.

13. A container as claimed in claim 12 and having separate air inlet and outlet valves spaced apart in the container.

14. A container as claimed in claim 8 and having means for cyclically raising and lowering wheels of the vehicle to exercise the suspension of the vehicle.

15. A container as claimed in claim 14 wherein the wheel supports comprise rollers with cam surfaces shaped to raise and lower the vehicle one or more times in each revolution of a roller.

16. A container as claimed in claim 15 wherein the rollers are coupled to be driven in synchronism.

17. A container as claimed in claim 8 wherein means are provided for differentially raising and lowering wheel supports for separate wheels of the vehicle to excercise the suspension of the vehicle.

* * * * *